(12) United States Patent
Zhang et al.

(10) Patent No.: US 11,114,944 B2
(45) Date of Patent: *Sep. 7, 2021

(54) FULLY INTEGRATED MULTI-PHASE BUCK CONVERTER WITH COUPLED AIR CORE INDUCTORS

(71) Applicant: International Business Machines Corporation, Armonk, NY (US)

(72) Inventors: Xin Zhang, Chappaqua, NY (US); Todd E. Takken, Brewster, NY (US); Naigang Wang, Ossining, NY (US); Leland Chang, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/707,186

(22) Filed: Dec. 9, 2019

(65) Prior Publication Data

US 2020/0112254 A1 Apr. 9, 2020

Related U.S. Application Data

(63) Continuation of application No. 16/124,334, filed on Sep. 7, 2018, now Pat. No. 10,505,456.

(51) Int. Cl.
*H02M 3/158* (2006.01)
(52) U.S. Cl.
CPC ................. *H02M 3/1584* (2013.01)
(58) Field of Classification Search
CPC .................... H02M 3/1584; H02M 2003/1586
See application file for complete search history.

(56) References Cited

U.S. PATENT DOCUMENTS

| 7,449,867 | B2 | 11/2008 | Wu et al. |
| 8,716,991 | B1 | 5/2014 | Ikriannikov |
| 2011/0148560 | A1 | 6/2011 | Ikriannikov |
| 2014/0210443 | A1 | 7/2014 | Liu |
| 2015/0062989 | A1 | 3/2015 | Su et al. |
| 2015/0303810 | A1 | 10/2015 | Chang et al. |

(Continued)

OTHER PUBLICATIONS

List of IBM Patents or Patent Applications Treated as Related.

*Primary Examiner* — Peter M Novak
(74) *Attorney, Agent, or Firm* — Scully, Scott, Murphy & Presser, P.C.; Daniel P. Morris (57) ABSTRACT

A multi-phase buck switching converter having grouped pairs of phases, each phase using two magnetically coupled air-core inductors. For each group, a first driver circuit controlling switching of a first power transistor switching circuit coupled to a first air-core inductor output for driving an output load at the first phase. A second driver circuit controlling switching of a second power transistor switching circuit coupled to a second air-core inductor output for driving said output load at the second phase. The first and second phases are spaced 180° apart. The coupled air-core inductors per group of such orientation, separation distance and mutual inductance polarity relative to each other such that magnetic coupling between the two or more inductors at each phase results in a net increase in effective inductance per unit volume. Each air-core inductor is a metal slab of defined length, height and thickness formed using back-end-of-line semiconductor manufacturing process.

17 Claims, 8 Drawing Sheets

(56) References Cited

U.S. PATENT DOCUMENTS

| | | |
|---|---|---|
| 2016/0268904 A1 | 9/2016 | Melendy et al. |
| 2017/0187285 A1 | 6/2017 | Kim et al. |
| 2018/0190628 A1* | 7/2018 | Male .................. H01F 38/14 |
| 2019/0206613 A1* | 7/2019 | Lin .................... H01F 27/2804 |

* cited by examiner

FULLY INTEGRATED MULTI-PHASE BUCK CONVERTER WITH COUPLED AIR CORE INDUCTORS

STATEMENT REGARDING FEDERALLY SPONSORED RESEARCH OR DEVELOPMENT

This invention was made with Government support under Contract No.: 95083063 awarded by Department of Energy. The Government has certain rights in this invention.

FIELD

This disclosure relates generally to switching direct current-direct current (DC-DC) converter power supplies and particularly to a novel multi-phase switching buck direct (DC-DC) converter power supply integrated with coupled air core inductors used for supplying electrical power to a load.

BACKGROUND

Multi-phase buck converters are widely used to perform DC-DC voltage conversion in many applications.

Air core inductors have been used in such converter power supplies because they do not have any magnetic loss and do not have a magnetic core to saturate.

SUMMARY

A multi-phase switching buck DC-DC converter having multiple two or more air core inductors per phase and employing magnetic coupling between the two or more inductors at each phase.

A multi-phase switching buck DC-DC converter having multiple (two or more) magnetically coupled air core inductors per phase oriented to increase an effective inductance per unit volume of each converter.

A multi-phase switching buck DC-DC converter having multiple two or more air core inductors per phase and employing magnetic coupling between the two or more inductors at each phase, and the air core inductors are formed in a semiconductor substrate according to a back-end-of-line (BEOL) semiconductor manufacturing process.

In one aspect, there is provided a multi-phase switching power supply converter. The multi-phase switching power supply converter comprises: grouped pairs of phases, each phase having two magnetically coupled air-core inductors, wherein each group comprises: a first driver circuit controlling switching of a first power transistor switching circuit coupled to a first air-core inductor having an output for driving an output load at a first phase of the switching power supply converter; a second driver circuit controlling switching of a second power transistor switching circuit coupled to a second air-core inductor having an output for driving the output load at the second phase, the first and second phases being spaced 180° apart, the coupled first and second air-core inductors per group of such orientation and mutual inductance polarity relative to each other such that magnetic coupling between the two or more inductors at each phase results in a net increase in effective inductance per unit volume.

In a further aspect, there is provided an n-phase buck converter power supply. The n-phase buck converter power supply comprises: n/2 driving stages, each driving stage comprising: a first driver circuit receiving a first pulsed signal used for driving an output load at a first phase of the n-phases, the first driver controlling switching of a first power transistor switching circuit coupled to a first air-core inductor for driving the output load at the first phase. The second driver circuit receives a second pulsed signal used for driving the output load at a second phase of the n-phases, the second driver controlling switching of a second power transistor switching circuit coupled to a second air-core inductor for driving the output load at the second phase, the first and second phases being spaced 180° apart. The first air-core inductor is magnetically coupled with the second air-core inductor such that a polarity of the first driver circuit and second driver circuit driving the respective first air-core and second air-core inductors relative to the magnetic coupling of the inductors results in a net increase in effective inductance per unit volume of each first and second air-core inductor when supplying a current to the load.

DETAILED DESCRIPTION

Figure 1:
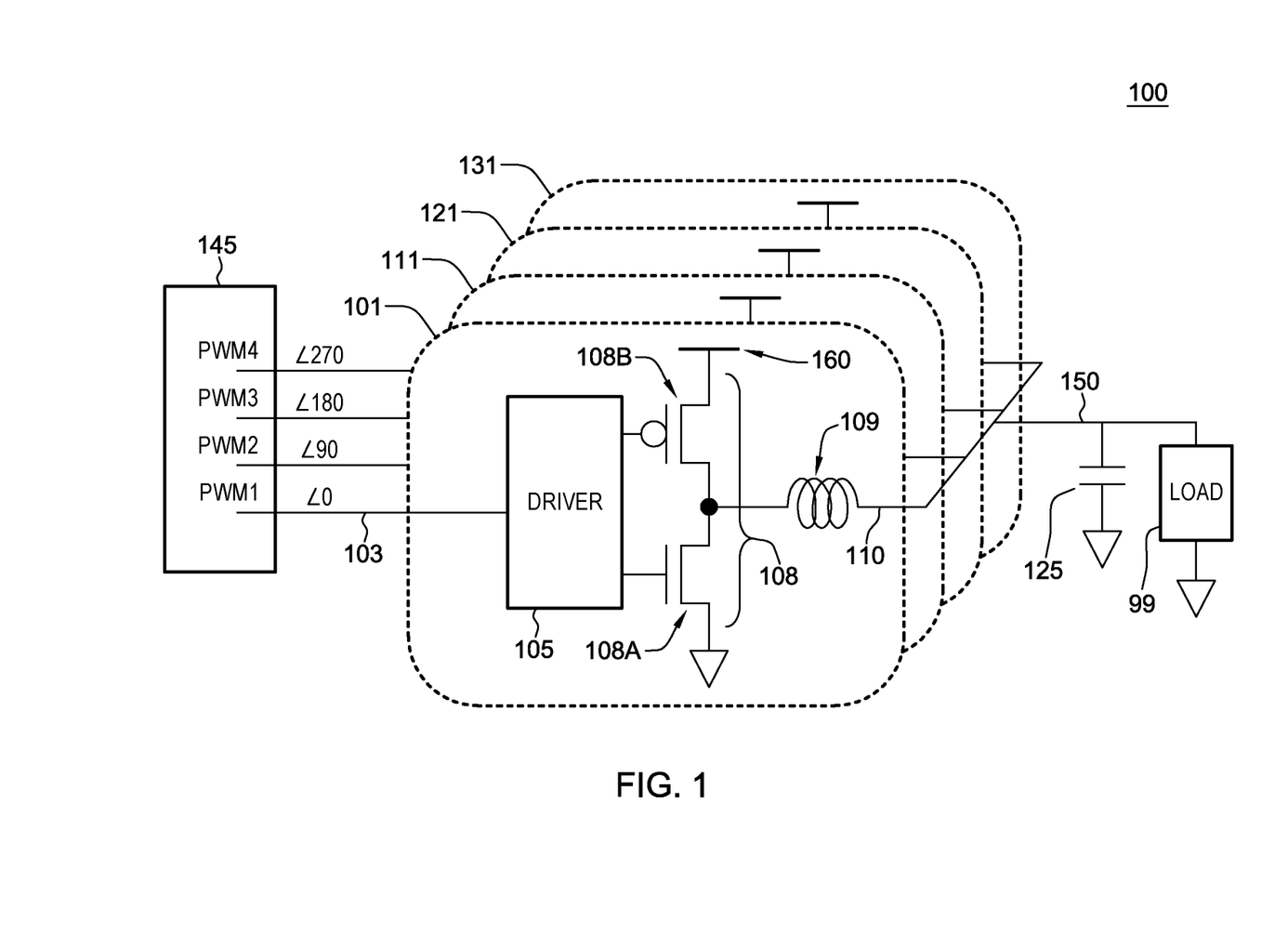
FIG. 1 shows a schematic depiction of a conventional multiphase switching buck regulator.

FIG. 1 shows a schematic depiction of a multiphase switching buck regulator 100 including a parallel set of buck (buck converter) power switching circuit stages 101, 111, 121 and 131. As shown in FIG. 1, each buck circuit stage 101-131 includes its own driver circuit, e.g., the switching driver circuit 105 shown in the power switching circuit stage 101 associated with a phased signal input 103 at 0° degrees. At each stage, the driver circuit, e.g., driver circuit 105, provides phased output signals that control a switching network 108 of connected power transistors, e.g., n-channel MOSFET 108A and p-channel MOSFET 108B connected at a common terminal. In particular, respective output signals of driver circuit 105 are timed to switch on/off respective gates of MOSFETs 108B, 108B to provide current through a connected inductor 109 resulting in drive signal 110 for powering a connected electrical load 99. Collectively, the driver and switching power transistors and inductor components of each stage is referred to as a phase. These phases are connected in parallel, and their respective phased output signals 110 are combined at 150 to drive the connected load 99. Each circuit stage further share an output capacitor 125. Further at each phase, a switching power MOSFET 108B is connected to and switch via an integrated circuit power grid conductor output current supplied from a power supply source 160.

During steady state multi-phase buck converter operation, individual phases are active at spaced intervals equal to 360°/n throughout the switching period where n is the total number of phases. FIG. 1 shows a n=4 (four phase) buck converter design with each buck circuit stage 101-131 contributing in parallel respective 90° phase separated output signals based on pulse signal inputs at 0°, 90°, 180° and 270° received from pulse signal generator(s) 145. As shown, the respective 90° phase separated output signals are combined to drive the load. In an n=8 buck converter configuration, each buck converter stage contributes a respective phase of eight successive 45° phase inputs (e.g., 0°, 45°, 90°, 135°, 180°, 225°, 270°, 315°). In the n=4 buck converter, the pulsed signal generator 145 is configured to generate and provide pulses indicated as input Pulse-Width Modulated signals PWM1, . . . , PWM4 associated with respective 0°, 90°, 180° and 270° phase at each respective driver input at each respective stage 101, 111, 121, 131. For example the first input signal PWM1 would be the first input pulse signal 103 at 0° to first converter stage 101. Each driver stage 101-131 control the switching power MOSFETS to provide respective 90° spaced-apart outputs that contribute to the switched DC current supplying the load.

In exemplary operation at each phase, the driver circuit 105, responds to the input pulses 103 to turn on and off synchronously the high-side or main power FET, i.e., main MOSFET switch 108B and low-side or synchronous side power FET, e.g., synchronous MOSFET 108A. Based on a portion of the pulsed input signal 103, driver circuit 105 operates to turn the main MOSFET 108B on to conduct and transfer energy from input power source 160 to output load and charge the inductor 109. During a portion of the input signal 103 which turns off the main MOSFET switch 108B, the synchronous MOSFET switch 108A turns on, circulates the inductor current and provide a current path for the inductor when discharging. The stored energy within the inductor, when discharged, continues to supply the load current in the same direction.

Figure 2:
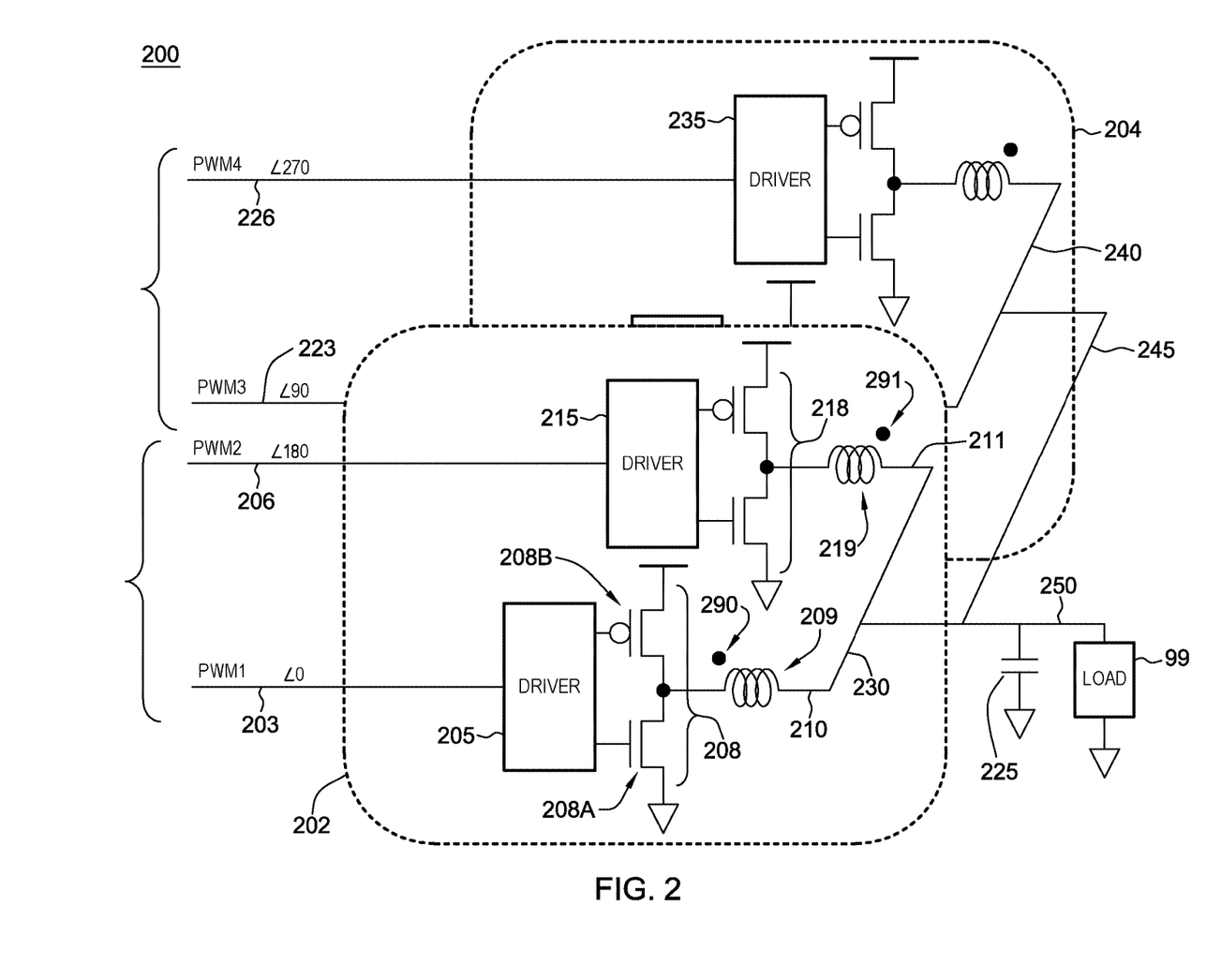
FIG. 2 shows a n-phase buck DC-DC voltage converter 200 according to an exemplary embodiment.

FIG. 2 shows an n-phase buck DC-DC voltage converter 200 according to an exemplary embodiment. In an embodiment, the buck DC-DC voltage converter 200 is a step-down type of voltage conversion unit. The converter 200 shown in FIG. 2 is an n=4 (i.e., four-phase) buck converter 200 in which the phases are connected (grouped) in pairs such as pairs 202, 204. In this embodiment, each phase of the pair of grouped phases of a multi-phase buck converter 200 include driver circuits responsive to corresponding PWM signal inputs that are phased 180° apart. In the embodiment depicted, a first pair of grouped phases 202 includes respective buck converter load driver circuits 205, 215 that receive respective pulsed input signals PWM1 and PWM2 spaced 180° apart. In response, each driver circuit 205, 215 respectively times a switching of connected power MOSFETs of respective sets 208, 218 of coupled switching power MOSFETs to drive current to the connected electrical load 99 through respective air-core inductors 209, 219. In the grouped phases 202, 204, the operations of the driver circuit MOSFETs and air-core inductors for driving the load is as described with respect to FIG. 1. Thus, for example, stage 202 providing the pair of grouped phases at 0° and 180° generate respective output currents 210, 211 from each respective driver 205, 215 that are combined to provide a common output signal 230 that shares an output capacitor 225 and that drives the electrical load 99.

In an embodiment, as will be described with respect to FIGS. 3A-3C, for each stage 202, 204 of grouped (paired) phases in the multi-phase switching buck converter 200, each air-core inductor of the pair are fabricated on or within a carrier, e.g., a semiconductor integrated circuit substrate (not shown), at such a physical proximity and orientation such that they are magnetically coupled when current is flowing through them. Moreover, a configuration of the paired air-core inductors is such that their mutual conductance polarity relative to each other effectively increases the inductance per unit volume of each air-core inductor of that pair. For example, as shown in FIG. 2, for each air-core inductor 209, 219 of the grouped pair of phases in stage 202, each inductor is configured with a respective mutual inductance polarity 290, 291 designating the polarity of the mutual voltage. That is, an increasing current flowing into a dotted terminal 290 of the air-core conductor 209 will induce a positive voltage at the dotted terminal 291 of the coupled air-core inductor 219. The increased inductance per unit volume of each air-core inductor may be on the order of 10% to 30% or greater percent value compared to the inductor values in the embodiment of FIG. 1.

Paired phase stage 204 includes like driver circuit and switching power MOSFET elements and air-core inductor elements and operates similarly as stage 202. However, while paired stage 202 includes buck converter drive stage 205 receiving PWM1 signal 203 at phase 0° and buck converter drive stage 215 receiving PWM2 signal 206 at relative phase 180°, parallel-operating grouped phase 204 includes a buck converter drive stage receiving PWM3 signal 223 at relative phase 90° and a buck converter drive stage 235 receiving PWM4 signal 226 180 degrees apart at relative phase 270°. Each driver circuit of the paired phase stage 204 also generated respective output currents through respective air-core inductors that are combined as output current signal 240. The outputs of paired phase stage 204 further share output capacitor 225 to drives the electrical load 99. That is, the combined output currents 230 at phases 0° and 180° from stage 202 and combined output currents 240 at phases 90° and 270° from stage 204 are further combined via connecting conductor 245 to supply the total switched output current 250 to load 99.

Figure 2A:
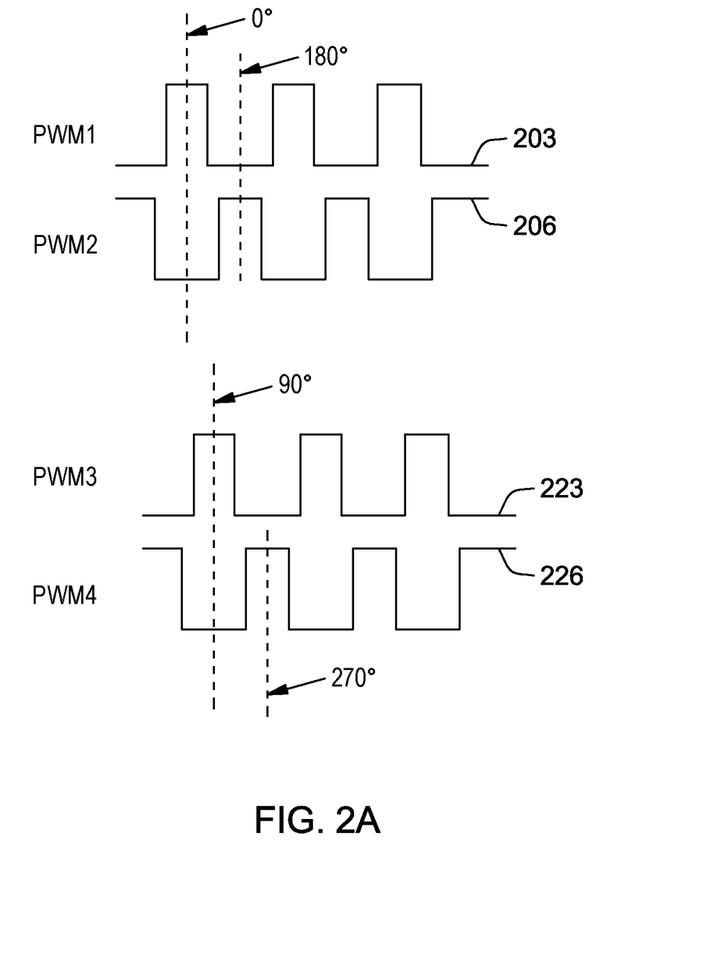
FIG. 2A shows a timing diagram of the PWM1, PWM2, PWM3, PWM4 signals input to the n-phase buck DC-DC voltage converter stages in the exemplary embodiment.

FIG. 2A shows a timing diagram of the PWM1, PWM2 signals 203, 206 at respective phases 0° and 180° input to respective drivers 205, 215 at grouped buck converter stage 202 and additionally shows the timing of PWM3, PWM4 signals 223, 226 at respective phases 90° and 270° input to respective drivers at grouped buck converter stage 204.

As mentioned, each phase of the group of paired phases of the n-phase buck DC-DC voltage converter of FIG. 2 is a circuit stage as shown in the embodiment of FIG. 1 and operates similarly. As an example, for the exemplary grouped pair of phases in circuit 202, the driver circuit 205, responds to the input pulses 203 to turn on and off synchronously the high-side or main power FET, i.e., main MOSFET switch 208B and low-side or synchronous side power FET, e.g., synchronous MOSFET 208A. Based on a portion of the pulsed input signal 203, driver circuit 205 operates to turn the main MOSFET 208B on to conduct and transfer energy from input power source to output load and charge the air-core inductor 209. During a portion of the input signal 203 which turns off the main MOSFET switch 208B, the synchronous MOSFET switch 208A turns on, circulates the inductor current and provide a current path for the inductor when discharging. The stored energy within the inductor, when discharged, continues to supply the load current in the same direction. The paired phases of the second parallel-operating second stage 204 are similarly operated using the pulse signals 223, 226.

Figure 3A:
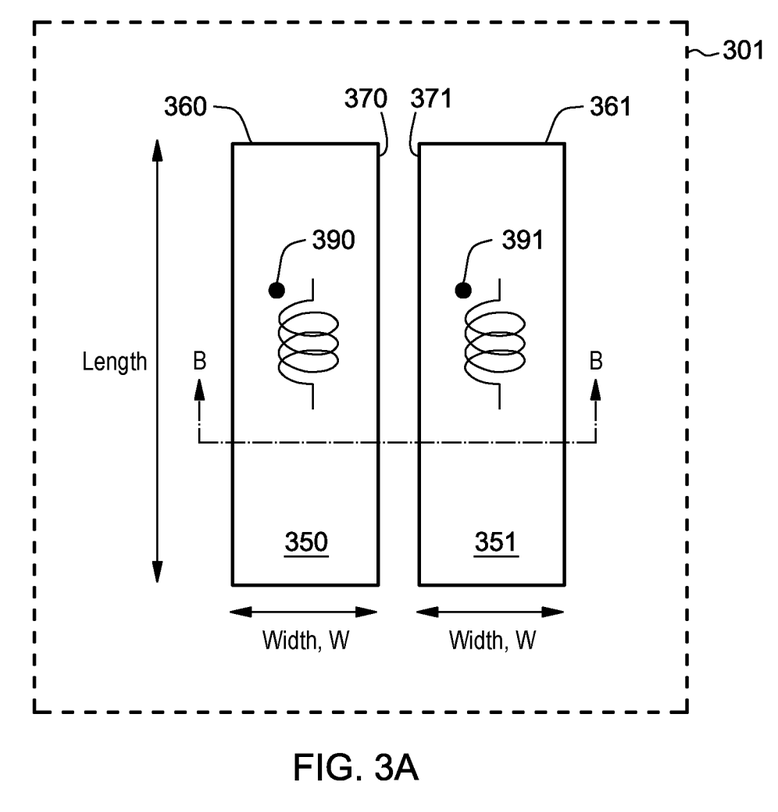
FIG. 3A is an enlarged top view of two air-core inductors situated in a grouped buck converter driver stage according to FIG. 1.

FIG. 3A is an enlarged top view of two air-core inductors 350, 351 situated in a grouped buck converter driver stage according to FIG. 1. In an embodiment, both air-core inductors 350, 351 are open slab-type metal (non-magnetic) inductors (e.g., copper) having an input connecting to respective paired switched power FETs formed in a semiconductor substrate 301. Each open-slab type (air-core) inductor 350, 351 may include features as described in commonly-owned, co-pending U.S. patent application Ser. No. 14/753,586 [US 20150303810], wholly incorporated by reference herein. For instance, each air-core inductor 350, 351 is an inductor coupled with and embedded within a low permeability medium and/or an inductor coupled with at least one layer of magnetic shielding (e.g., ferromagnetic) material disposed between the inductor and potential return current paths of a power grid.

As shown in FIG. 3A, the open slab-type air-core inductors 350, 351 have identical length and width dimensions and physically oriented parallel to each other. In an embodiment, respective widthwise edges 360, 361 of paired inductors 350, 351 are co-linear, and lengthwise edges 370, 371 lie parallel to each other.

In an embodiment, each air-core inductor 350, 351 are fabricated to have a respective mutual inductance polarity represented by dotted terminals 390, 391 designating the polarity of the mutual voltage. For example, an increasing current flowing into a dotted terminal 390 of the air-core conductor 350 will induce a positive voltage at the dotted terminal 391 of the second air-core inductor 351. In this configuration, the switched output current being spaced 180 degrees apart that flows through respective inductors 350, 351 causes an increase in the effective inductance of the magnetically coupled inductors.

Figure 3B:
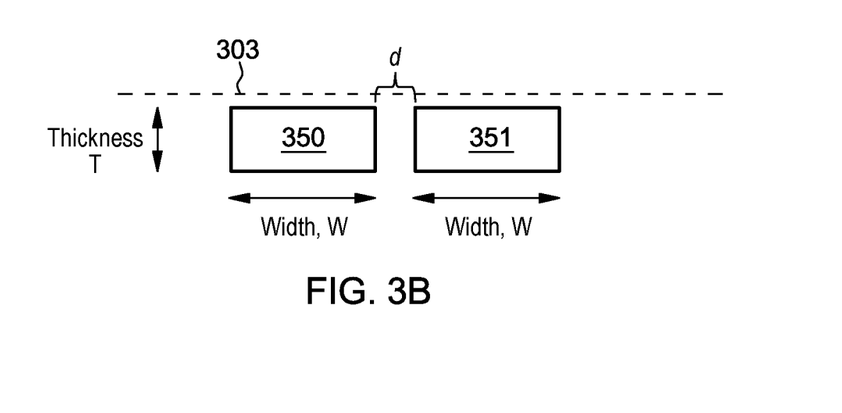
FIG. 3B shows an enlarged cross-sectional view of the open slab inductors taken along line B-B of FIG. 3A.

FIG. 3B shows an enlarged cross-sectional view of the open slab inductors taken along line B-B of FIG. 3A formed at or beneath a surface 303 of the semiconductor substrate 301. As shown in the cross-sectional view of FIG. 3B, each air-core inductor 350, 351 is a metal slab of a thickness T and spaced apart by a distance d. The distance "d" is variable to achieve maximum magnetic coupling due to current flow in each inductor to thereby increase effective inductance per unit volume of each inductor. In an embodiment, the air-core inductor is a relatively wide and thick metal (e.g., copper) inductor slab of cross sectional area to reduce resistive losses, increase electrical conductivity and thus allow for high Q factors (e.g., as much as 30 and greater). Distance d between the open slab inductors and the thickness T of the slab inductors can be on the order of microns and designed to maximize the mutual inductance.

In an embodiment, the metal slab inductors are fabricated from the back end of line (BEOL) wiring layers in a semiconductor chip fabrication process. The air-core inductors can be made from a post-fabrication metal layer or are made from a substrate metal layer. The inductors and driver circuitry may be formed on the same semiconductor chip or substrate.

Figure 4:
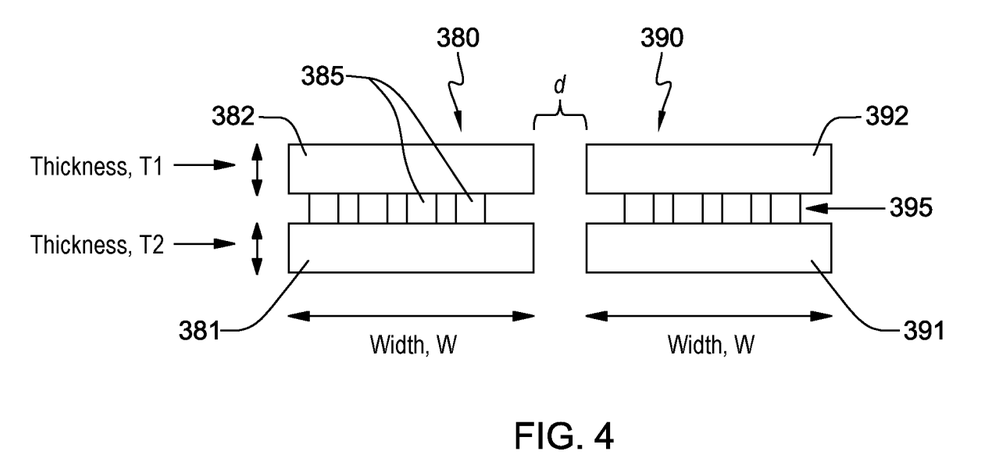
FIG. 4 shows an enlarged cross-sectional view of a further embodiment of the coupled air core inductors that form grouped pair of phases at each multiphase buck converter stage in embodiments herein.

FIG. 4 shows a cross-sectional view of a further embodiment of coupled air-core inductors 380, 390 corresponding to inductors 350, 351 of FIGS. 3A and 3B associated with the paired phases of a multi-phase buck converter stage. In the embodiment of FIG. 4, each air-core inductor 380, 390 is formed as two overlying metal slab inductors (paired layer) separated by multiple conductive vias. For example, first air core inductor 380 if formed as a first metal slab 381 at a first metal layer and a second metal slab 382 overlying the first slab 381 at a second metal layer formed above the first metal layer in a BEOL wiring layer fabrication process. After forming the lower metal slab 381, one or more series of conductive metal vias 385 are formed lengthwise and transverse along its width. Formed atop the vias is the second metal slab inductor 382 with the vias providing conductive connections between the first and second metal slabs 381, 382. Likewise, in same semiconductor fabrication processes, separated by the distance d is formed the coupled second air-core inductor 390 including a first metal slab 391 at the first metal layer and a second metal slab 392 overlying the first slab 391 at the second metal layer formed above the first metal layer in the BEOL wiring layer fabrication process. After forming the lower metal slab 391, one or more series of conductive metal vias 395 are formed lengthwise and transverse along its width. Formed atop the vias is the second metal slab inductor 392 with the vias providing conductive connections between the first and second metal slabs 391, 392.

As shown in FIGS. 4, T1 and T2 are the thickness of the top two layers of the BEOL metals in each slab inductor 381, 382 and 391, 392 of respectively coupled air-core inductors 380, 390. In an embodiment, the thicknesses T1 and T2 are each thinner than the thickness "T" of the slab air-core inductor of FIG. 3B. In non-limiting example embodiment, T1 and T2 are both about 1.25 µm thick, via thickness (height) is about 1.6 µm, via width of via is about 0.8 µm. Additionally, the vias 385 and 395 are not in the direction of current flow, and do not affect the inductor operation. In an embodiment, as many conductive vias 385, 395 between and connecting top and bottom metal layer slab inductor are fabricated as possible in accordance and defined by design rule limits from the foundry fabricating the chip in order to reduce inductor resistance.

Figure 3C:
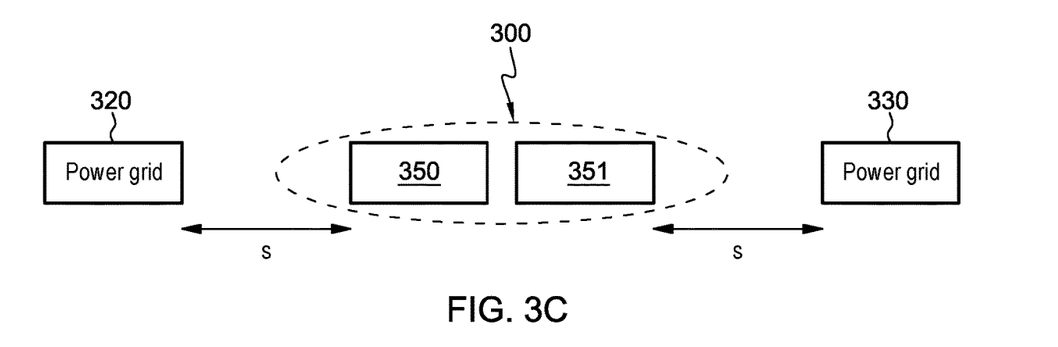
FIG. 3C shows the elevation cross-sectional view of FIG. 3B including the proximity of the mutual coupled inductors to conductive structures that source or sink current.

FIG. 3C shows the elevation cross-sectional view of FIG. 3B including the proximity of the mutual coupled inductors 350, 351 to conductive structures that source or sink current. In an embodiment, such conductive structures include wires 320, 330 providing respective power and return lines of a power grid for the semiconductor chip. In an embodiment, FIG. 3C depicts a magnetic coupling 300 of the air-core inductors 350, 351. Depending upon the distance "s" between an air-core inductor 350, 351 and a respective power grid line 320, 330 will determine the strength of the magnetic field. In an embodiment, the greater the spaced distance "s" means the higher the self-inductance of each inductor. While a greater distance "s" also means larger physical size of the device, there is a trade-off between high inductance and size compactness. In further embodiments, magnetic coupling due to power grid currents can be reduced or eliminated by embedding the open slab inductors in a magnetic shielding layer.

Figure 3D:
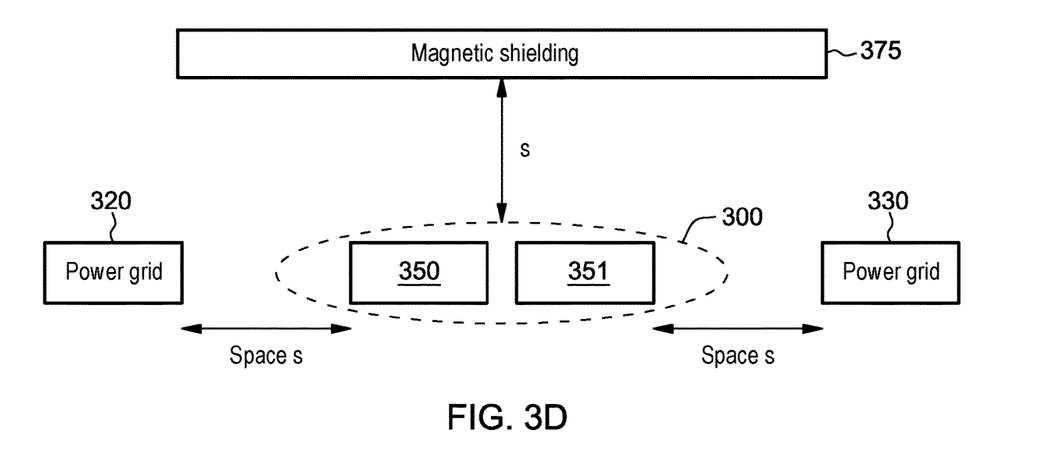
FIG. 3D depicts the layout of the circuit of FIG. 3C showing formed above and overlying each coupled air-core inductors a magnetic shielding structure in one embodiment.

It is understood that while the power grid is a most common example of an interfering conductor which may impact the open slab inductor unless properly located or shielded, a magnetic shielding layer can shield the slab inductor from impacting any signal wire running close to or adjacent or proximate to the slab inductor(s). FIG. 3D depicts the layout of the circuit of FIG. 3C showing formed above and overlying each coupled air-core inductors 350, 351 a magnetic shielding structure 375, e.g., a magnetic material, that can be used to shield the inductors from magnetic interference due to presence of other current carrying wires that may be proximately located above the shield. The proximately located wires may be power grid wires 320, 330 or other current carrying structures or devices not shown.

As shown in FIG. 3D, the magnetic shielding structure 375 (a high permeability material such as ferromagnetic material) can be spaced above a top surface of the air-core inductors 350, 351 at least at a distance "s" corresponding to the lateral distance "s" between an inductor and the nearest power grid line 320, 330. The magnetic shielding structure 375 can be located at a vertical distance "s" that is shorter than the lateral space "s" between the inductors 350, 351 to each of the power grid conductor lines 320, 330. Further, the magnetic shielding structure 375 can be extended over each of the power grid lines 320, 330.

Figure 5:
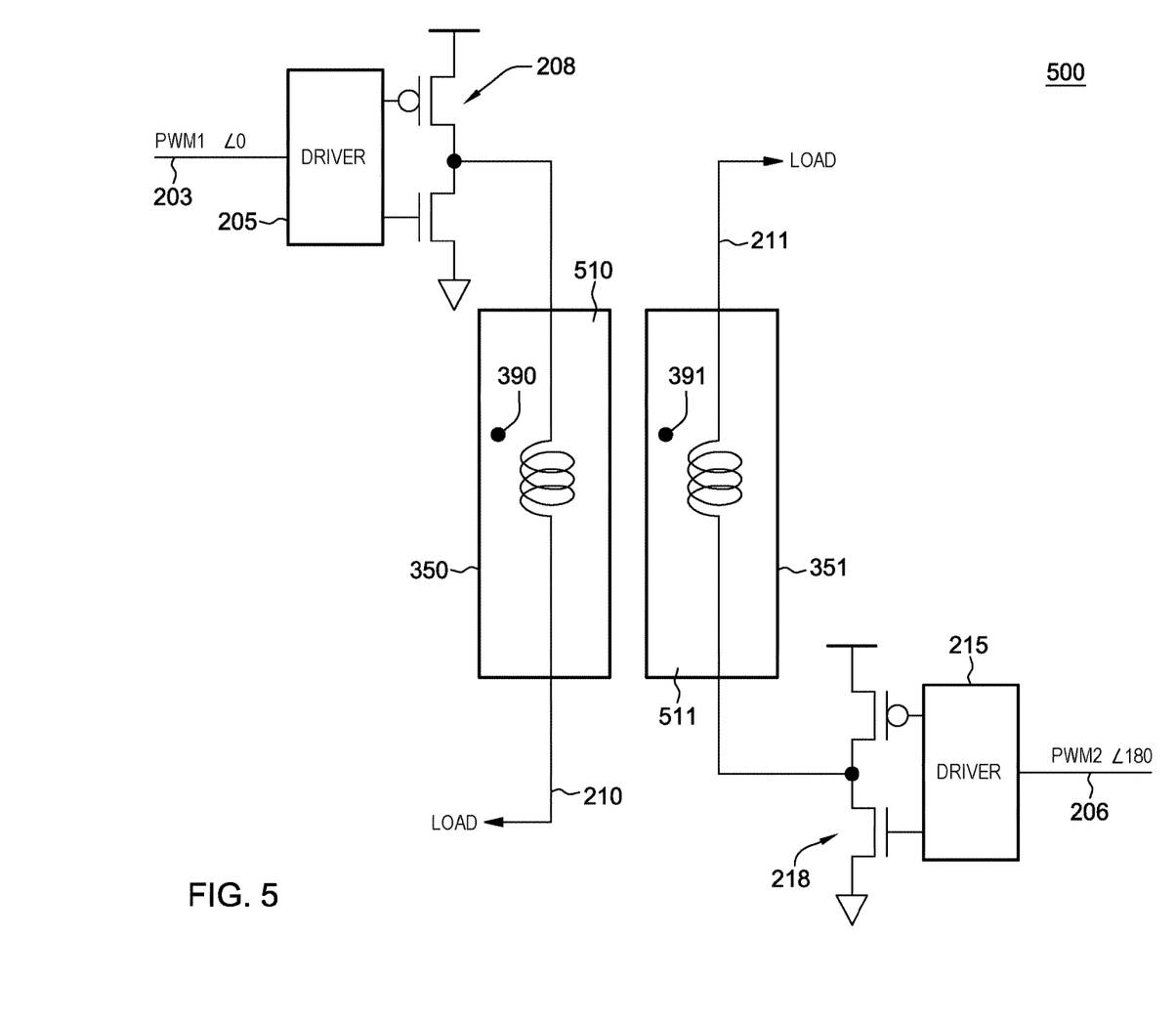
FIG. 5 shows an embodiment of a multiphase buck converter physical layout in a semiconductor device integrated with coupled air core inductors fabricated during the back end of line (BEOL) wiring layer processes in an embodiment.

FIG. 5 shows an embodiment of a multiphase buck converter physical layout in a semiconductor device integrated with coupled air core inductors fabricated during the back end of line (BEOL) wiring layer processes in a semiconductor manufacturing process in an embodiment. As shown in FIG. 5, multiphase buck converter layout 500 is integrated with coupled air core inductors 350, 351 having mutual inductance polarity indicated as 391, 392 as shown. In the multiphase buck converter layout of FIG. 5, there is depicted a schematic layout of a first grouped driver phase 202 providing 0 degrees and 180 degrees of the output current to a load. Each respective phase includes respective driver circuits 205, 215 and switching MOSFET circuitry 208, 218 and respective output conductor wires 210, 211 that are eventually combined for connecting to the load device through respective metal slab air-core inductors 350, 351. The metal slab air-core inductors 350, 351 are in a parallel alignment as shown in FIG. 5 and in proximity such that they are magnetically coupled and exhibit increased effective inductance according to embodiments shown in FIGS. 3A-3D and FIG. 4. In an embodiment, the respective driver circuits 205, 215 are shown physically connected at opposite ends 510, 511 of a respective coupled slab air-core inductor 350, 351. Such configuration depicted in FIG. 5 provides that a respective power grid conductor (supply line or ground) is spaced apart at least the distance "s" from each coupled metal slab-type air-core inductor shown in FIGS. 3A-3D and 4 to minimize magnetic coupling effects, interference and noise of the nearby power grid conductors and/or switching transistors. The multiphase buck converter circuit layout 500 may include a magnetic shielding slab to shield the inductors 350, 351 from any conductive metal wire.

Figure 6A:
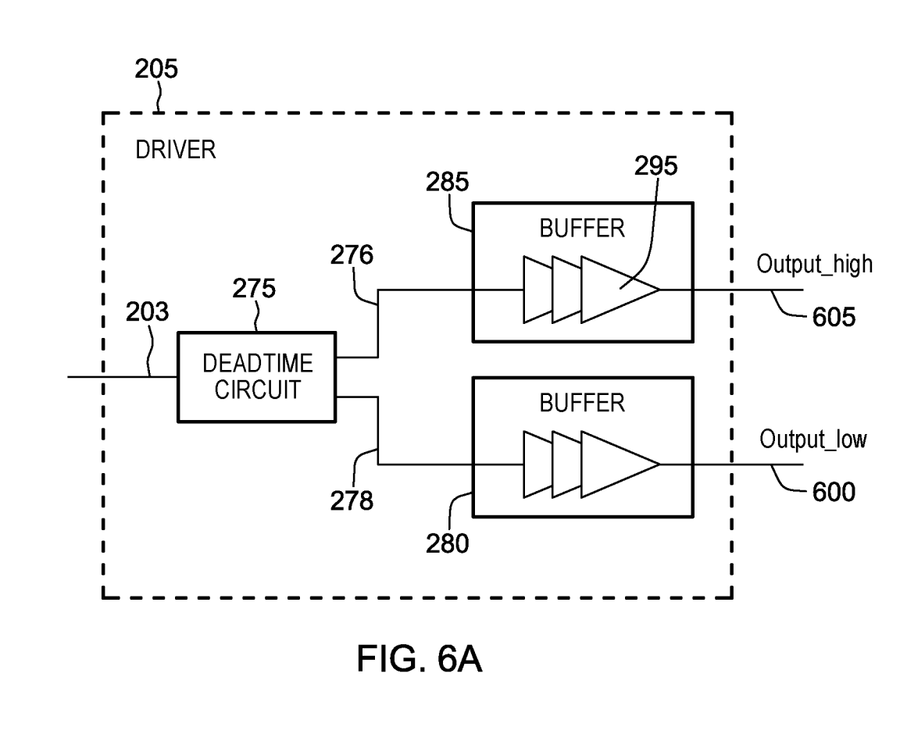
FIG. 6A shows an embodiment of the driver circuit in each phase of the multiphase buck converter according to embodiments herein.
Figure 6B:
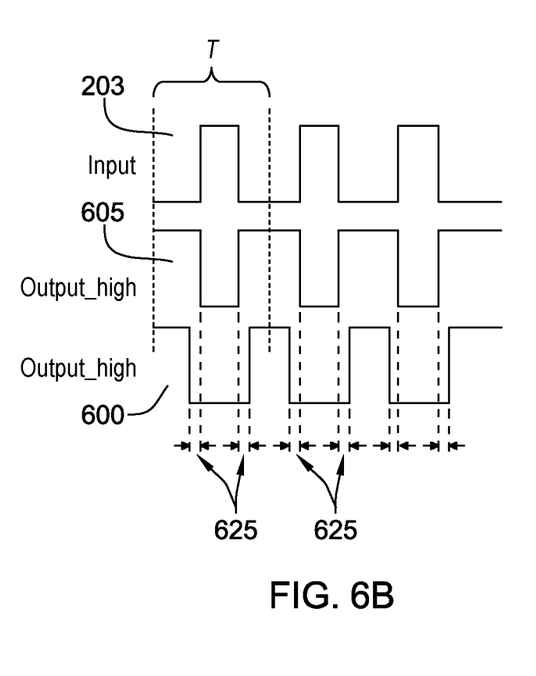
FIG. 6B shows a timing diagram of signals output of the deadtime processing circuit that processes input signal at each phase used for switching main and synchronous switching transistors.

FIG. 6A shows an embodiment of the driver circuit 205, 215 in each phase 202, 204. In an exemplary embodiment, driver 205 associated with 0° phase is shown including a deadtime processing circuit 275 that receives input pulsed signal PWM1 203 and processes signal 203 to generate two signals 276, 278 that are input into respective buffer circuits 280, 285. Each buffer circuit 280, 285 includes one or more series connected logic inverter stages 295 which as shown in FIG. 6B provides respective output signal 600, 605. Output signal 605 is a buffered version of generated signal 276 and is inverted from the original PWM1 input signal 203 to form the main or high-side power MOSFET input of the phase. The output signal 600 is the low-side or synchronous side signal having a modified duty cycle (ratio of its ON/OFF time to the complete period time T) as processed by the deadtime circuit 275. In the timing diagram of FIG. 6B, deadtime circuit 275 processes input signal 203 such that the low or "off" time portion of the Output_low signal 600 is extended for a buffer time 625 and consequently its "on" time has decreased relative to Output_high signal 605 for the same duty cycle. That is, deadtime circuit 275 processing modifies the duty cycle of one of the power MOSFET drive signals of the original input PWM1 to ensure that both power MOSFETs are not turned on at the same time. Output signals 600, 605 ensure that, with reference to FIG. 2, for each phase, the high-side or main power FET, i.e., main MOSFET switch 208B, and low-side or synchronous side power FET, e.g., synchronous MOSFET 208A, turns on and off synchronously such that the main power MOSFET receives Output_high signal 605 and is turned on and conducts to transfer energy from input power source to output load and charges its inductor, and Output_low signal 600 turns off the main MOSFET switch and the synchronous MOSFET switch turns on to circulate the inductor current and provide a current path for that inductor when discharging.

The multi-phase switching buck converter power supply and circuit and physical layouts depicted herein with respect to FIGS. 2, 3A-3D, 4 and 5 and 6-6B greatly boosts the power efficiency of the multi-phase buck converter which uses air core inductors and: advantageously provide for a net increase in effective inductance per unit volume of the inductors; provides a lower peak to peak current in the inductor, therefore lower AC current loss; provides a smaller form factor due to utilizing BEOL metal layers, or post fabrication metal layer; and, in embodiments, exhibit reduced magnetic coupling when magnetic shielding slab is used to shield the inductors.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

The invention claimed is:

1. A multi-phase switching power supply converter comprising:
    grouped pairs of phases, each phase having two magnetically coupled air-core inductors, wherein each group comprises:
    a first driver circuit controlling switching of a first power transistor switching circuit coupled to a first air-core inductor having an output for driving an output load at a first phase of said switching power supply converter;
    a second driver circuit controlling switching of a second power transistor switching circuit coupled to a second air-core inductor having an output for driving said output load at the second phase, the first and second phases being spaced 180° apart, the coupled first and second air-core inductors per group of such orientation and mutual inductance polarity relative to each other such that magnetic coupling between the two or more inductors at each phase results in a net increase in effective inductance per unit volume, wherein each said magnetically coupled first air-core inductor and said second air-core inductor is a respective metal slab formed spaced apart in parallel alignment in a semiconductor substrate, the metal slabs being coplanar and having a same length, a same width and a same thickness, said metal slabs of said coupled first air-core and said second air-core inductors are in a same physical orientation such that respective lengthwise edges of respective said first air-core inductor and said second air-core inductor are aligned in parallel, and respective widthwise edges of respective said first air-core inductor and said second air-core inductor are co-linear, and wherein the first driver circuit of a group pair drives said output load through a physical connection to a first end of said first air-core inductor metal slab at a first phase of 0 degrees phase when supplying said current, and said second driver circuit of the group pair drives said output load through a physical connection to an opposite end of said second air-core inductor metal slab at a second phase of 180 degrees when supplying said current to said output load.

2. The multi-phase switching power supply converter as claimed in claim 1, wherein each said coupled first air-core inductor and said second air-core inductor comprises:
a pair of metal slabs formed in a semiconductor substrate, a first metal slab of each pair overlying a second metal slab of said pair, the first and second metal slab of each pair having a length, a width and a thickness; and
a plurality of conductive vias formed between and having first and second ends contacting said first metal slab and second metal slab of each pair, the conductive vias having a first edge contacting the first metal slab and a second edge contacting the second overlying metal slab.

3. The multi-phase switching power supply converter as claimed in claim 2, wherein each overlying first metal slab and second metal slab of each respective pair of metal slabs are in a same physical orientation such that respective lengthwise edges of respective said overlying first and second metal slabs of said first air-core inductor and respective said overlying first and second metal slabs of said second air-core inductor are aligned in parallel, and respective widthwise edges of respective said overlying first and second metal slabs of said first air-core inductor and of respective said overlying first and second metal slabs of said second air-core inductor are substantially co-linear.

4. The multi-phase switching power supply converter of claim 3, wherein the paired metal slabs defining first air-core and second air-core inductors are made from one a metal layer selected from a group of: a post fabrication metal layer or a substrate metal layer.

5. The multi-phase switching power supply converter as in claim 3, further comprising:
a magnetic shielding structure formed in said substrate for shielding the paired metal slabs defining each first and second air-core inductors from a magnetic coupling due to proximately located current carrying or signal carrying conductors or devices.

6. An n-phase buck power supply converter comprising:
n/2 driving stages, each driving stage comprising:
a first driver circuit receiving a first pulsed signal used for driving an output load at a first phase of said n-phases, the first driver controlling switching of a first power transistor switching circuit coupled to a first air-core inductor for driving said output load at the first phase;

a second driver circuit receiving a second pulsed signal used for driving the output load at a second phase of said n-phases, the second driver controlling switching of a second power transistor switching circuit coupled to a second air-core inductor for driving said output load at the second phase, the first and second phases being spaced 180° apart, said first air-core inductor being magnetically coupled with said second air-core inductor such that a polarity of the first driver circuit and second driver circuit driving the respective first air-core and second air-core inductors relative to the magnetic coupling of the inductors results in a net increase in effective inductance per unit volume of each first and second air-core inductor when supplying a current to said load, wherein each said coupled first air-core inductor and said second air-core inductor is a respective metal slab formed spaced apart in a semiconductor substrate, the metal slabs being coplanar having a same length, a same width and a same thickness, said metal slabs of said coupled first air-core and said second air-core inductors are in a same physical orientation such that respective lengthwise edges of respective said first air-core inductor and said second air-core inductor are aligned in parallel, and respective widthwise edges of respective said first air-core inductor and said second air-core inductor are co-linear, and the metal slab defining said first air-core inductor connecting the first power transistor switching circuit to said load, and the metal slab defining said second air-core inductor connecting the second power transistor switching circuit to said load, and wherein the first power transistor switching circuit of said first driver circuit drives said output load through a physical connection to a first end of said first air-core inductor metal slab at a first phase of 0 degrees phase when supplying said current, and said second power transistor switching circuit of said second driver circuit of the group pair drives said output load through a physical connection to an opposite end of said second air-core inductor metal slab at a second phase of 180 degrees when supplying said current to said output load.

7. The n-phase buck power supply converter as in claim 6, where the first air-core inductor includes a first mutual inductance polarity and the second air-core inductor includes a second mutual inductance polarity, the first and second mutual inductance polarity ensuring the respective net increase in inductance per air-core inductor volume of respective first and second air-core inductors when supplying current phased 180° apart to said load through respective first and second air-core inductors.

8. The n-phase buck power supply converter as in claim 6, where the first power transistor switching circuit and the second power transistor switching circuit each includes a connection of a first transistor and a second transistor at a common first terminal, wherein a second terminal of said first transistor connects to a power supply conductor of a power grid and a second terminal of said second connected transistor connects to a ground conductor of the power grid, said metal slab defining said first air-core inductor connecting said common first terminal of the first power transistor switching circuit and said load, and said metal slab defining said second coupled air-core inductor connecting said common first terminal of the second power transistor switching circuit and said load.

9. The n-phase buck power supply converter as claimed in claim 8, wherein the first common terminal connection of the first power transistor switching circuit is connected to the metal slab of the first air-core inductor at a first end, the second end of the metal slab connecting to the load; and the first common terminal connection of the second power transistor switching circuit is connected to the metal slab of the second air-core inductor at a first end, the second end of the metal slab connecting to the load, and wherein the first end of the metal slab of the second air-core inductor is an opposite end than the first end of the metal slab of the first air-core inductor.

10. The n-phase buck power supply converter as in claim 8, where the first air-core inductor and second air-core inductor are spaced apart a distance from either one or more of said power grid supply conductor or said power grid ground conductor to prevent any magnetic coupling between either said power grid power supply conductor and ground conductor and said coupled first air-core inductor and second air-core inductor.

11. The n-phase buck power supply converter as in claim 8, further comprising: a magnetic shielding structure formed in said substrate for shielding the metal slabs defining the first and second air-core inductors from a magnetic coupling due to proximately located current carrying or signal carrying conductors or devices.

12. The n-phase buck power supply converter as claimed in claim 6, wherein each said coupled first air-core inductor and said second air-core inductor comprises:
   a pair of metal slabs formed in a semiconductor substrate, a first metal slab of each pair overlying a second metal slab of said pair, the overlying first and second metal slab of each pair having a length, a width and a thickness; and
   a plurality of conductive vias formed between and having first and second ends contacting said first metal slab and second metal slab of each pair, the conductive vias having a first edge contacting the first metal slab and a second edge contacting the second overlying metal slab.

13. The n-phase buck power supply converter as claimed in claim 12, wherein each overlying first metal slab and second metal slab of each respective pair of metal slabs are in a same physical orientation such that respective lengthwise edges of respective said overlying first and second metal slabs of said first air-core inductor and respective said overlying first and second metal slabs of said second air-core inductor are aligned in parallel, and respective widthwise edges of respective said overlying first and second metal slabs of said first air-core inductor and of respective said overlying first and second metal slabs of said second air-core inductor are substantially co-linear.

14. The n-phase buck power supply converter as claimed in claim 6, wherein each said n/2 driving stages are formed as circuits on a semiconductor substrate of an integrated circuit, wherein each said first and second air-core inductor are formed using back-end-of-line semiconductor manufacturing process.

15. The n-phase buck power supply converter as claimed in claim 6, wherein the first air-core and second air-core inductors are made from one a metal layer selected from a group of: a post fabrication metal layer or a substrate metal layer.

16. The n-phase buck power supply converter as claimed in claim 6, wherein a first phase of a first driver circuit driving the output load at each successive stage of said n/2 driving stages is spaced at a multiple of 360/n degrees apart; and a second phase of second driver circuit driving the output load at each successive stage of said n/2 driving stages is spaced at a multiple of 360/n degrees apart.

17. The n-phase buck power supply converter as claimed in claim 6, wherein n=4, said buck power supply converter comprising two driving stages, wherein:
   for a second stage: the first driver circuit drives said output load through said first air-core inductor at a first phase of 90 degrees phase when supplying said current and said second driver circuit drives said output load through said second air-core inductor at a second phase of 270 degrees when supplying said current to said load.

\* \* \* \* \*